United States Patent [19]
Grove et al.

[11] Patent Number: 5,155,633
[45] Date of Patent: Oct. 13, 1992

[54] ANAMORPHIC ACHROMATIC PRISM FOR OPTICAL DISK HEADS

[75] Inventors: Steven L. Grove; Curtis A. Shuman, both of Colorado Springs, Colo.

[73] Assignee: Applied Magnetics Corporation, Goleta, Calif.

[21] Appl. No.: 738,115

[22] Filed: Jul. 30, 1991

[51] Int. Cl.$^5$ .......................... G02B 5/04; G02B 27/10
[52] U.S. Cl. ..................................... 359/834; 359/837; 359/669; 359/633; 359/637; 359/640
[58] Field of Search ............... 359/834, 833, 831, 837, 359/669, 737, 633, 637, 638, 639, 640, 629

[56] References Cited

U.S. PATENT DOCUMENTS

| | | |
|---|---|---|
| 2,405,960 | 8/1946 | Land . |
| 4,084,180 | 12/1978 | Stoffels et al. . |
| 4,128,308 | 12/1978 | McNaney . |
| 4,333,173 | 6/1982 | Yonezawa et al. . |
| 4,542,492 | 9/1985 | Leterme et al. . |
| 4,573,149 | 2/1986 | Deguchi et al. . |
| 4,607,356 | 8/1986 | Bricot et al. . |
| 4,627,690 | 12/1986 | Fantone . |
| 4,750,819 | 6/1988 | Sugiki . |
| 4,770,507 | 9/1988 | Arimoto et al. . |
| 4,808,823 | 2/1989 | Moore et al. . |
| 4,822,151 | 4/1991 | Tatsuno et al. . |
| 4,850,686 | 7/1991 | Morimoto et al. . |
| 4,872,747 | 10/1989 | Jalkio et al. . |
| 4,948,233 | 8/1990 | Maruyama . |

OTHER PUBLICATIONS

Warren J. Smith, *Modern Optical Engineering*, McGraw-Hill, 1966, pp. 72–77.

*Primary Examiner*—Jon W. Henry
*Attorney, Agent, or Firm*—Knobbe, Martens, Olson & Bear

[57] ABSTRACT

A multi-element, air-spaced prism system for use in a reflective-type optical media device having a light source to provide an incident light beam provides an achromatic, anamorphic prism which corrects for astigmatism and ellipticity in the light beam from the light source. One embodiment of the prism system provides at least two reflections of a return beam from the reflective-type optical media. The return prism provides these reflections from various optical surfaces in the multi-element prism system. In one embodiment, the prism system also provides a reflection of a portion of the incident beam. This reflection is directed to a detector which can, for instance, monitor the intensity of the light beam.

24 Claims, 8 Drawing Sheets

ANAMORPHIC ACHROMATIC PRISM FOR OPTICAL DISK HEADS

BACKGROUND OF THE INVENTION

1. Field of the Invention

The present invention relates to optical memory systems using anamorphic prisms for light-beam shaping and/or steering. More particularly, the present invention involves minimizing errors and beam angle changes which result from lateral chromatic aberration in the anamorphic prism. The invention also involves providing multiple surfaces to reflect the return beam to various detectors. The invention has particular advantages in optical disk systems, for instance, optical data storage systems, compact disc systems, and laser video disk systems.

2. Description of the Related Art

Optical disk systems often employ an anamorphic prism for adjustment of laser beam ellipticity, for the removal of laser beam astigmatism, and/or for beam steering. References such as U.S. Pat. No. 4,333,173 issued to Yonezawa, et al., U.S. Pat. No. 4,542,492 issued to Leterme, et al. and U.S. Pat. No. 4,607,356 issued to Bricot, et al. describe using simple anamorphic prisms for beam shaping in optical disk applications.

Frequently, the anamorphic prism systems have an embedded thin film to reflect some or all of a returning beam (reflected from optical media) to a detection system. U.S. Pat. No. 4,573,149 to Deguchi, et al describes the use of thin films to reflect a return beam to detection systems. Furthermore, the entrance face of the anamorphic prism is often used to reflect the returning beam to a detection system as described in U.S. Pat. Nos. 4,542,492 and 4,607,356. Often, it is advantageous to have multiple detection channels. For instance, in optical disks, one detector may provide data signals and another detector may provide control signals such as tracking and/or focus servo signals.

A typical problem with conventional prisms is that the anamorphic prism suffers from chromatic dispersion which can result in lateral chromatic aberration. In other words, when the wavelength of the light source changes, the resulting angles of refraction through the anamorphic prism also change. These changes result in a lateral beam shift when the beam is focussed onto optical media such as an optical disk. In optical disk systems, a small shift in the beam may cause erroneous data signals. For instance, if the shift is sudden and in the data direction, the beam may skip data recorded on the optical disk.

If the light source (e.g., a laser) were truly monochromatic, the chromatic aberration in the prism would not cause a problem. However, several factors often cause the laser spectrum to change. For instance, most laser diodes respond with a change in wavelength when the power increases. In magneto-optic disk systems, an increase of power occurs when pulsing the laser from low to high power to write to the optical disk, as is well understood in the art. This increase in laser power often causes a wavelength shift of around 1.5 to 3 nanometers (nm) in conventional systems. Most laser diodes also respond to a change in temperature with a change in the wavelength. Additionally, random "mode-hopping" can cause unpredictable wavelength changes commonly ranging from 1–2 nanometers. RF modulation is often applied to laser diodes operating at read power in order to minimize the effect that "mode-hopping" has on the system. However, the RF modulation increases the spectral bandwidth and can change the center frequency. Moreover, RF modulation is not generally used when the laser is operating at write power. In a non-achromatic system, a sudden change in the wavelength of the incident light typically results in a lateral beam shift in the focussed spot of up to several hundred nanometers. A lateral beam shift of this magnitude could cause significant errors in the data signal.

Using multi-element prism systems to correct chromatic dispersion is known in the art of optical design. Textbooks such as Warren J. Smith, *Modern Optical Engineering*, McGraw-Hill, 1966, pp. 75–77 discuss this idea. Furthermore, some optical disk systems use multi-element anamorphic prism systems which are achromatic. However, typical existing multi-element prism systems require the multiple prism elements to be separately mounted. Mounting the multiple elements increases the expense and difficulty of manufacturing because each element must be carefully aligned with respect to the other elements in the system. Small deviations in alignment can cause significant variations in function. This also complicates quality control. Other existing multi-element prism systems have attached elements to form a unitary prism, but these prism systems require that the prism material of each prism be different in order for the system to be achromatic. Finally, existing systems which are achromatic do not provide return beam reflections to multiple detection systems.

SUMMARY OF THE INVENTION

Therefore, an anamorphic, achromatic prism system in which wavelength changes in the light source do not significantly affect system function would provide significant advantages in optical disk system design, particularly, if the prism system was a unitary prism which provided for return beam reflections to more than one detection system. It would be further advantageous if the system facilitated accurate and easy manufacturing and also provided beam steering capabilities between the incident light beam and the exit light beam.

The present invention provides a multi-element, substantially achromatic, anamorphic prism system for use in optical systems, particularly reflective-type optical disk systems, where the optical disk reflects the light beam back through the prism system. The prism system of the present invention is compact and allows beam steering between the input beam and the exit beam. By providing beam steering capabilities, the system can be designed to be very compact. This is advantageous in order to provide an optical disk unit that fits within a conventional 3.5 inch disk drive for a computer, as is well known in the art. The present invention also provides for return beam reflections to at least two detection channels, for instance, a data channel and a control channel (e.g., servo channel), for focussing and tracking. In one embodiment, the prism system of the present invention also reflects a portion of the input beam to a detector. This is advantageous, for instance, for monitoring the intensity of the light beam.

The prism system of the present invention also has the advantage that the multiple prism elements are attached as a unitary prism. As mentioned above, prism systems with multiple elements are difficult to manufacture because each individual prism element must be mounted separately and aligned carefully. Moreover, when the elements are mounted separately, the prism system is very susceptible to temperature changes. This is because as the temperature changes, the expansion or contraction of the mounting components may differ from component to component for the same change in temperature. Thus, with a change in temperature, the alignment may be adversely affected.

Additionally, conventional unitary prism systems do not provide multiple return beam reflections to detection systems. The system of the present invention is unitary (i.e., the prisms in the system are all directly attached) so that the individual prism elements need not be separately mounted in the optical system. This configuration reduces the mounting time, reduces the number of stations required for assembly, increases the stability of the system due to changes, particularly in temperature, and decreases the manufacturing cost. Furthermore, the unitary design is compact, allowing for a decrease in size in optical disk systems.

According to one aspect of the present invention, a chromatic correcting prism is provided which is symmetrical so that it has no net expansion effect on the input beam. Additionally, the chromatic correcting prism and the anamorphic prism are configured such that the input beam, after passing through the chromatic correcting prism, enters an air gap between the chromatic correcting prism and the anamorphic prism. Because the correcting prism has no net expansion, and because of the air-gap, the correcting prism can be used in conjunction with existing simple anamorphic prisms to significantly reduce the chromatic aberration in an existing anamorphic prism.

According to the present invention, a prism system is provided for use in an optical system having a light source which produces an incident light beam within a range of operating wavelengths from a given wavelength. The wavelength of the light beam typically varies over the range during operation of the light source. Desirably, the prism system has a chromatic correcting prism attached directly to an anamorphic prism. The anamorphic prism generally shapes the incident light beam. Advantageously, the prism system is designed such that an air gap exists between the correcting prism and the anamorphic prism, and such that the incident light beam passes through the air gap. In one embodiment, the prism system is substantially achromatic within the range of operating wavelengths and for a predetermined angle of incidence of the incident light beam to an entrance surface of the correcting prism.

According to another aspect of the present invention, the prism system is substantially achromatic over a range of angles from the predetermined angle of incidence, for wavelength shifts within the range of operating wavelengths.

According to yet another aspect of the present invention, the prism system has at least a 75% reduction in the chromatic aberration from a prism system with similar beam shaping and beam steering capabilities but without chromatic correction.

These and other advantages of the present invention will be apparent to those of ordinary skill in the art in view of the detailed description of the preferred embodiments below.

DETAILED DESCRIPTION OF THE PREFERRED EMBODIMENT

Figure 1:
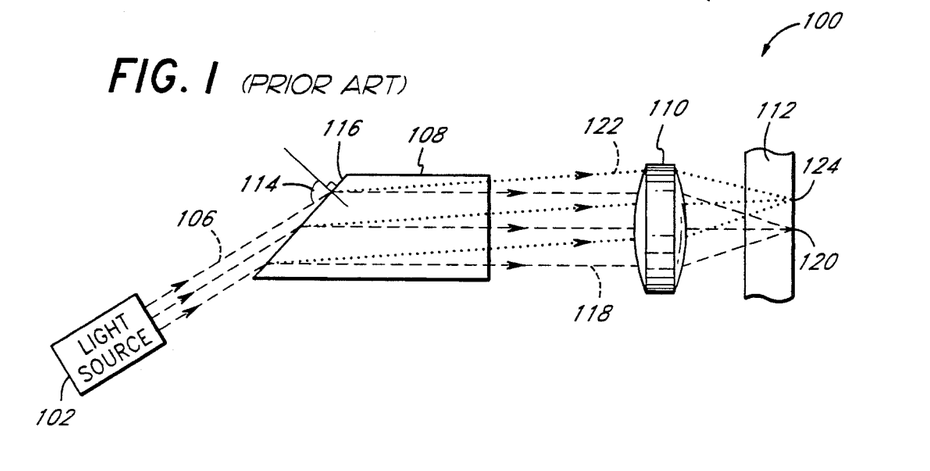
FIG. 1 depicts a simple anamorphic prism and illustrates the effect of chromatic aberration in the prism.

FIG. 1 depicts a prior art optical system 100 having a light source 102, which provides an incident light beam 106 depicted in dashed lines, a simple anamorphic prism 108, a focussing lens 110, and optical media 112. The light beam 106 enters the prism 108 at an incidence angle 114 with respect to the normal to the entrance face 116 of the prism. Laser light sources usually generate an elliptical beam with some astigmatism, as is well understood in the art. The anamorphic prism 108 provides expansion along the minor axis of the ellipse to correct for beam ellipticity. The angle of incidence 114 is selected to provide the desired expansion along the minor axis. The anamorphic prism 108 can also correct astigmatism in the incident light beam. The lens 110 focusses a resulting corrected beam 118 to form a spot 120 on the optical media 112.

The simple prism 108 is adequate as long as the wavelength of the incident light beam 106 remains constant. However, in practice, light sources typically change wavelength due to temperature changes, power shifts, random "mode hopping" and other conditions, as is well known in the art. In magneto-optic disk systems, the laser power continually shifts between the power level required for write operations and the power level required for read operations.

The angle of refraction of light at the interface of materials is calculated with Snell's law, as is well known in the art:

$$n_1 \sin\Theta_1 = n_2 \sin\Theta_2$$

where:
$n_1$ = index of refraction of material 1
$\Theta_1$ = angle of incidence with respect to normal
$n_2$ = index of refraction of material 2
$\Theta_2$ = angle of refraction with respect to normal This relationship governs the refraction of the light beam 106 when it enters the prism 108. As seen in FIG. 1, when an incident beam 106 of one wavelength enters the anamorphic prism 108, the beam is refracted at a given angle dictated by the index of refraction of the prism 108 and the angle of incidence 114 of the light beam 106. The resulting light beam 118, corrected for ellipticity, and possibly, astigmatism of the incident beam 106, enters the focussing lens 110 and results in the focussed light spot 120 on the optical media 112. The index of refraction, however, changes with wavelength. This is referred to as chromatic dispersion. Accordingly, when the wavelength of the incident light beam 106 changes, the angle of refraction resulting from the interface between air and the prism 108 is different than the angle of refraction for the previous wavelength. FIG. 1 depicts with dotted lines, the effect of a shift in the wavelength of the incident beam 106. The incident light beam 106 refracts at a different angle and results in the light beam 122 which enters the focussing lens 110 at a different angle to result in a focussed light spot 124 on the optical media 112. As illustrated in FIG. 1, the light spot 124 is displaced from the light spot 120. This displacement, resulting from a change in wavelength in the incident light beam, is referred to herein as lateral beam shift.

The lateral beam shift may be avoided by not employing the anamorphic prism 108. For instance, a system may employ a circular lens to provide a circular spot on the optical media. However, to form the circular spot with a lens, the lens only focusses a circular aperture within the elliptical light beam. This results in an inefficient use of the laser power because portions of the light beam outside the circular aperture are discarded. Accordingly, a system which does not employ the anamorphic prism for beam shaping does not benefit from the prismatic correction of ellipticity and astigmatism in the incident light beam. The beam shaping capabilities of the anamorphic prism provide efficient use of the laser power by expanding the elliptical beam into a circular beam. The efficient use of power is advantageous, particularly in optical disk systems when increased power is necessary in order to write to the disk.

Figure 2:
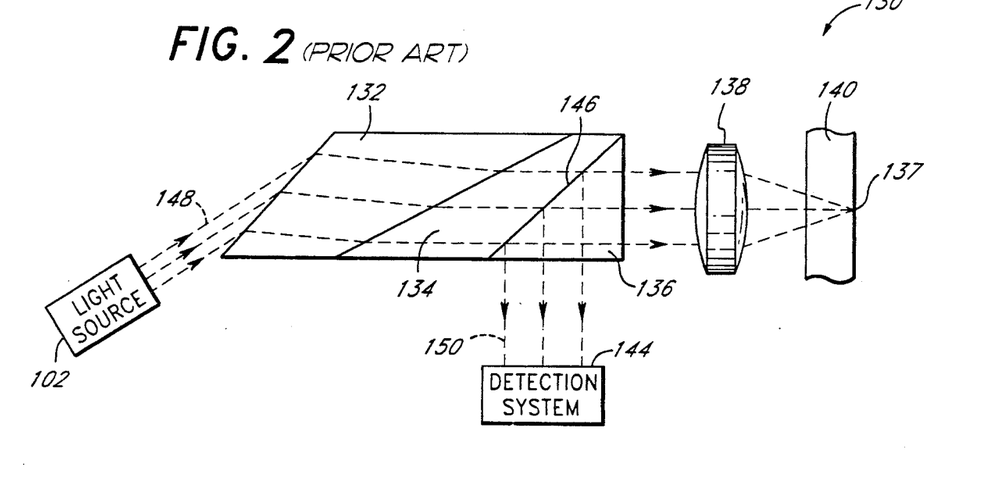
FIG. 2 depicts an existing multi-element anamorphic prism system.

FIG. 2 depicts a conventional configuration for a multi-element prism system 130, as is well known in the art. The system depicted consists of three prism elements, prism 132, prism 134 and prism 136, a focussing lens 138 and reflective-type optical media 140. The prism system 130 could be designed to be achromatic by proper selection of the individual prism geometries, indexes of refraction and dispersions for prism 132, prism 134 and prism 136.

The prism system 130 depicted in FIG. 2 also allows reflection of a return beam from the optical media 140 to a detection system 144 by including a beam-splitting thin film 146 between the prism 134 and the prism 136.

As seen in FIG. 2, an entering light beam 148 passes through the prism 132, the prism 134 and the prism 136 and is focussed by the lens 138 to form a spot 137 on the optical media 140. The light beam reflects from the optical media 140 back through the focussing lens 138 into the prism 136, and reflects from the thin film 146 as a light beam 150. The light beam 150 enters the detection system 144.

If designed to be achromatic, changes in the input light beam 148 wavelength should not result in a lateral shift in the focussed light spot 137 on the optical media 140.

As previously explained, optical systems often benefit from more than one detector. A prism system with an air space in the light path could provide significant advantages, particularly in providing a compact, achromatic prism system capable of reflecting portions of the incident and return beams to multiple detectors. Furthermore, by using an air space, a symmetrical correcting prism can be added to an existing anamorphic prism system. Finally, a unitary prism system with an air space would be advantageous in order to provide a stable, compact and easy to manufacture and install, prism assembly.

Figure 3:
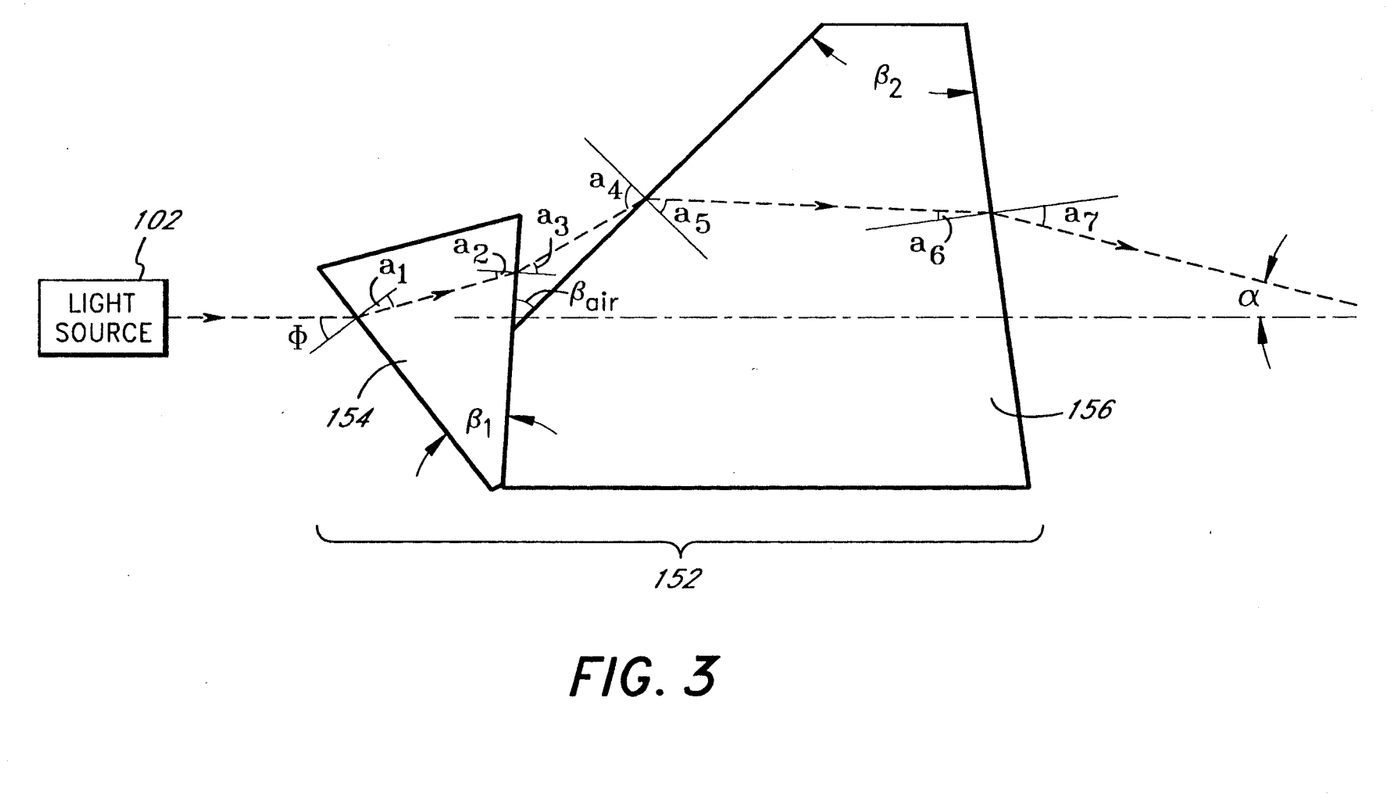
FIG. 3 depicts an exemplary air-spaced prism system according to the present invention.

In order to more fully explain the design of an achromatic prism system with an air space between prisms, reference is made to FIG. 3, which depicts a two-element prism system 152 having a chromatic correcting prism 154 added to a simple anamorphic prism 156. The correcting prism 154 has an index of refraction of $n_1$ and the simple anamorphic prism 156 has an index of refraction of $n_2$, at a selected wavelength. The angles in the system are represented as shown in FIG. 3 as $\Phi$, $a_1$, $a_2$, $a_3$, $a_4$, $a_5$, $a_6$, $a_7$, $\beta_1$, $\beta_2$, and $\beta_{air}$. The deviation angle from the incident beam to the exit beam is referenced as $\alpha$, where $$\alpha = \beta_1 + \beta_{air} - (a_7 + \Phi + \beta_2)$$

and $a_7$ can be calculated through repeated applications of Snell's law and the geometry of triangles, as follows:

$$a_1 = \sin^{-1}(n_1 * \sin(\Phi))$$
$$a_2 = a_1 - \beta_1$$
$$a_3 = \sin^{-1}(\sin(a_2)/n_1)$$
$$a_4 = a_3 - \beta_{air}$$
$$a_5 = \sin^{-1}(n_2 * \sin(a_4))$$
$$a_6 = a_5 + \beta_2$$
$$a_7 = \sin^{-1}(\sin(a_6)/n_2).$$

The design conditions are chosen to achieve a desired result (e.g., total deviation through the system). For instance, to design an achromatic system, the condition is that $\alpha$ be constant over some range of wavelengths.

For a desired expansion ratio $\Sigma$, the condition is met as follows:

$$\Sigma = \frac{\cos(a_1)}{\cos(\Phi)} * \frac{\cos(a_3)}{\cos(a_2)} * \frac{\cos(a_5)}{\cos(a_4)} * \frac{\cos(a_7)}{\cos(a_6)}$$

For a total desired deviation angle, $\alpha = A$, from the entrance beam to the exit beam, the condition is met as follows:

$$A = \beta_1 + \beta_{air} - (a_7 + \Phi + \beta_2)$$

Furthermore, the condition for making the correcting prism 154 a symmetrical prism with no net expansion of the incident light beam so that it can be added to the simple anamorphic prism 156, as shown in FIG. 3, is as follows:

$$\Phi = \sin^{-1}[n_1 * \sin(\beta_1/2)]$$

By selecting this condition, the correcting prism does not expand the incident light beam. Therefore, the correcting prism can be added to an existing anamorphic prism system selected to provide the appropriate expansion.

Finally, the prism assembly 152 can meet all of the desired design restraints by proper selection of $\Phi$, $\beta_1$, $\beta_2$, $\beta_{air}$, and of the glass dispersions, i.e., $$\frac{\delta n_1}{\delta \lambda} \text{ AND } \frac{\delta n_2}{\delta \lambda}$$

In some cases it may be desirable for the exit beam to have a significant deviation angle from the entrance beam. For instance, a deviation of 90° may be advantageous. This can be accomplished by providing a total internal reflection in prism 156 before the beam exits the prism. This changes the above calculations, but the design goals can still be met by proper selection of the parameters.

Applying the above principles for adding a symmetrical correcting prism to an existing anamorphic prism, a prism system was designed which has multiple surfaces to partially reflect the return beam to different detectors. Embodiments of unitary, air-spaced, achromatic prism systems with significant deviation angles between the entrance beam and the exit beam, along with multiple reflections to various detection systems are described below.

Figures 4, 4A:
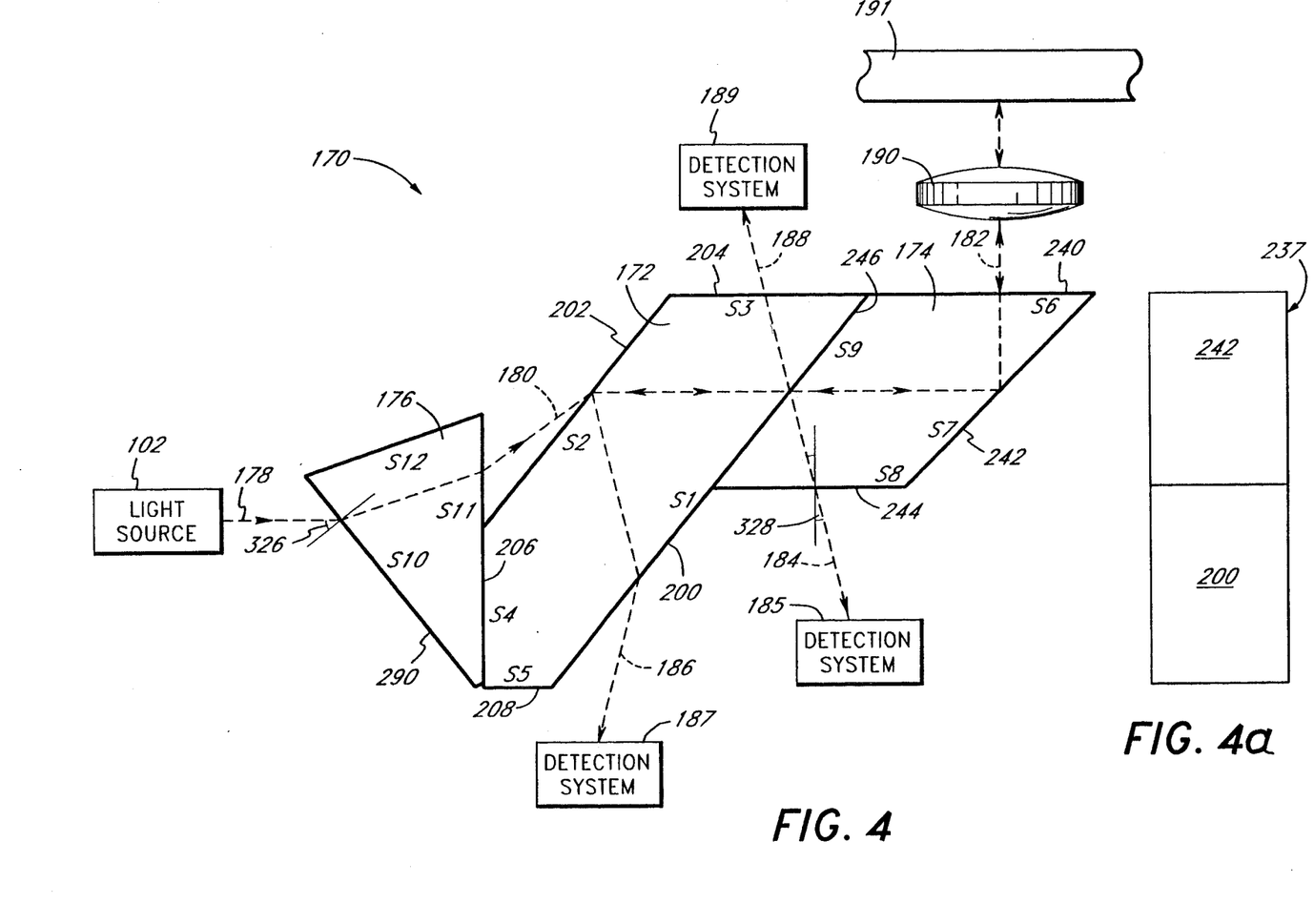
FIG. 4 and 4a depict one embodiment of an air-spaced, multi-element prism system of the present invention.

FIG. 4 depicts an embodiment of an air-spaced, anamorphic, achromatic prism system 170 according to the present invention. Preferably, the prism system 170, as depicted in FIG. 4, has three prisms bonded as a single unit. As previously explained, this provides the advantage that the prism assembly 170 is mounted as a single unit. Because the prisms are bonded together, they need not be separately mounted in the optical system. This reduces mounting time, increases stability of the system, decreases mounting costs, and minimizes functional deviations between different optical systems. The three prism elements are a plate prism 172, a trapezoidal prism 174 and a correcting prism 176. FIG. 4 also depicts the light beam path as a light beam 178 from the light source 102, an air gap light beam 180, an exit/reflected light beam 182, a first detector channel light beam 184 to a first detector 185, a second detector channel light beam 186 to a second detector 187, and a third detector light beam 188 to a third detector 189. By including an air gap between the correcting prism 176 and the plate prism 172 through which the air gap light beam 180 passes, the correcting prism 176 can be designed as a symmetrical corrector with no net expansion to the incident beam 178. Therefore, the correcting prism 176 can be added to the plate prism 172 and the trapezoidal prism 174 combination in order to achromatize the prism system 170 shown in FIG. 4.

FIG. 4 also depicts a lens 190 positioned to focus the exit light beam 182 onto optical media 191. The specifics of the design shown in FIG. 4 are described and designed to be substantially achromatic for a design wavelength of 785 ±22 nm. At this wavelength, the system will have the properties described below.

Figure 5:
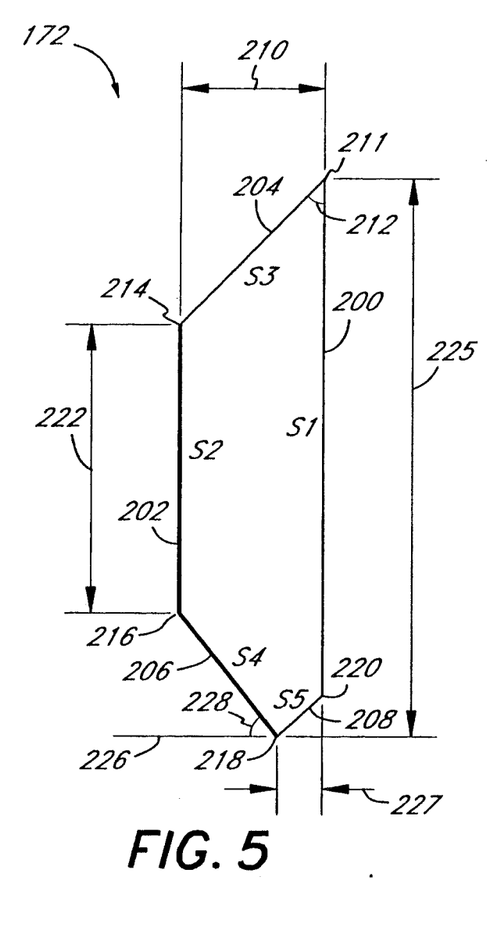
FIGS. 5, 5a and 5b depict side, bottom and top plan views, respectively, of the plate prism of the prism system embodiment depicted in FIG. 4.
Figure 5A:
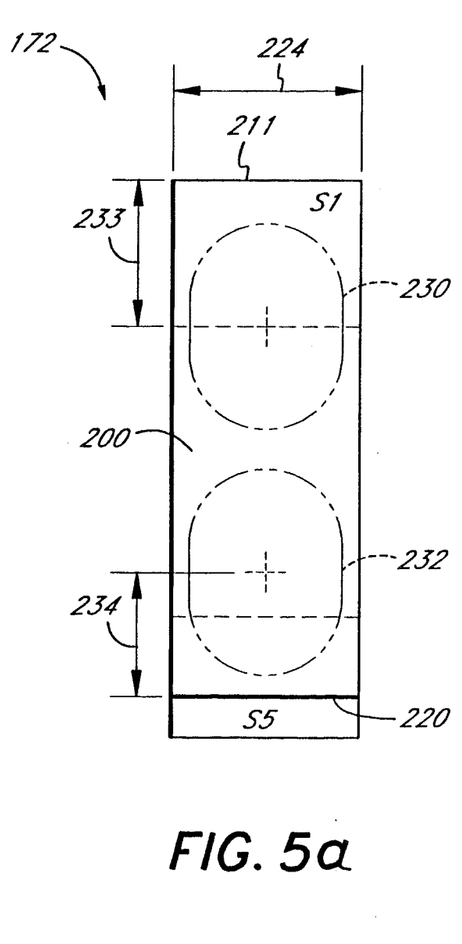
Figure 5B:
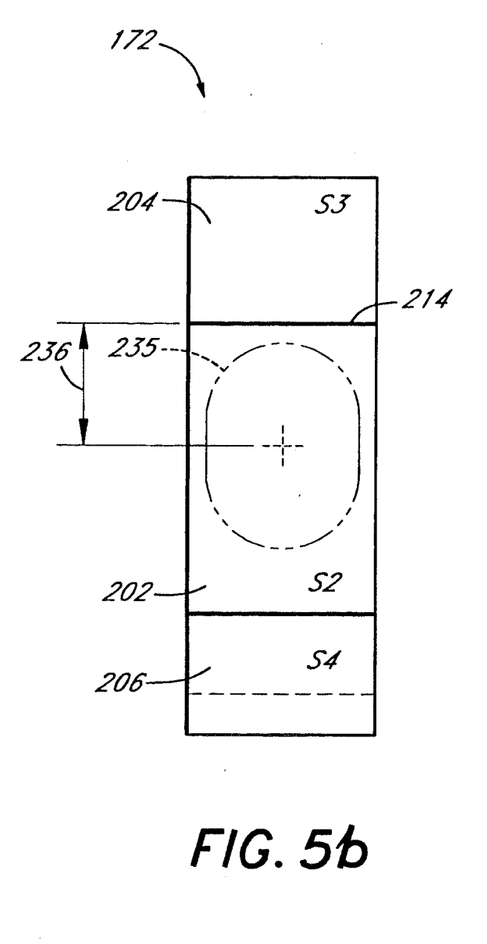

The plate prism 172 is depicted in more detail in FIGS. 5, 5a and 5b. FIG. 5 is a side view of the plate prism 172; FIG. 5a is a bottom plan view illustrating the surface S1 200; and FIG. 5b is a top plan view illustrating the surface S2 202. The plate prism has an optical surface S1 200, an optical surface S2 202, an optical surface S3 204, a surface S4 206 and a surface S5 208.

In one embodiment, the surface S1 200 and the surface S2 202 are substantially parallel and spaced apart at a distance designated in FIG. 5 as 210. In the present embodiment, the distance 210 is advantageously 6.27 mm. The surface S5 208 and the surface S3 204 are also substantially parallel in the present embodiment. The surface S1 200 and the surface S3 204 intersect and terminate at an edge 211 (i.e., the S1/S2 edge) in FIG. 5, at an angle 212 (i.e., the S1/S2 angle), which is advantageously 50°21′±10′ in the present embodiment. The surface S3 204 and the surface S2 202 intersect and terminate at an edge 214; the surface S2 202 and the surface S4 206 intersect and terminate at an edge 216; the surface S4 206 and the surface S5 208 intersect and terminate at an edge 218; and the surface S5 208 and the surface S1 200 intersect and terminate at an edge 220, as designated in FIG. 5. The surface S2 202 has a length referenced as 222 in FIG. 5 and a width referenced as 224 FIG. 5a. In the present embodiment, the length 222 is 13.34 mm and the width 224 is 8.0 mm. The overall length of the prism, referenced as 225 in FIG. 5, from the edge 218 to the edge 211 measured parallel to the surface S1 200 is advantageously 23.61 mm in the present embodiment. The distance from the edge 218 and the edge 220, referenced as 227, measured along a reference plane 226 defined perpendicular to the surface S1 200 and the surface S2 202 is advantageously 2.14 mm.

The plan view in FIG. 5a illustrates a clear aperture 230 and a clear aperture 232 defined on the surface S1 200. A clear aperture is simply an area of the surface of the prism over which the surface is specified to meet a selected quality. In the present embodiment, the clear apertures 230 and 232 are 8.5 mm by 6.5 mm ovals. Advantageously, the oval 230 is centered with its minor axis a distance referenced as 233 from the edge 211 and with its major axis centered in the middle of the surface S1 200 as shown in FIG. 5a. In the present embodiment, the clear aperture 232 is centered with its minor axis a distance referenced as 234 from the edge 220, and with its major axis centered along the middle of the surface S1 200. Advantageously, in the present embodiment, the distance 233 is 6.15 mm and the distance 234 is 5.30 mm.

The plan view depicted in FIG. 5b illustrates a clear aperture 235 defined on the surface S2 202. The present embodiment defines this clear aperture as an 8.5 mm by 6.5 mm oval with its minor axis centered a distance referenced as 236 from the edge 214 and its major axis centered in the middle of the surface S2 202 as depicted in FIG. 5b. In the present embodiment the distance 236 is 5.2 mm. The clear apertures 230, 232, and 235 define portions of the surfaces over which the surface quality is preferably at least 40/20, as is well known in the art. In the embodiment depicted, BK7 grade A fine annealed glass, well known in the art, is an appropriate optical material for the prism 172.

Figure 6:
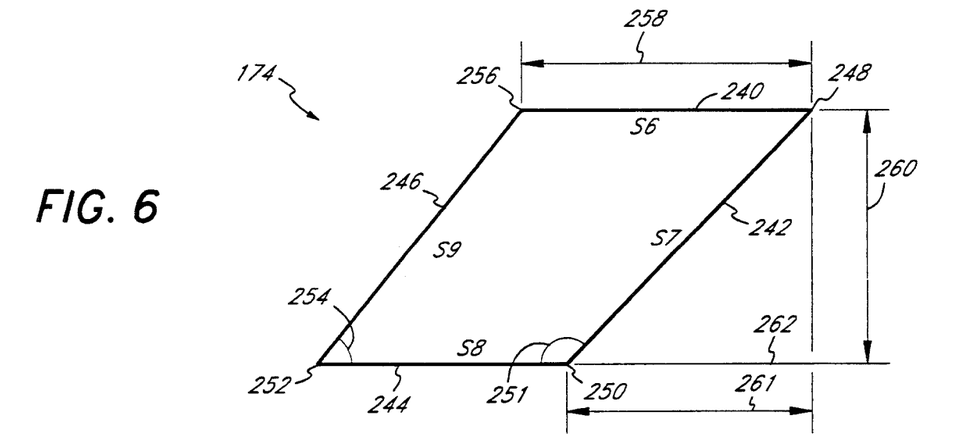
FIGS. 6, 6a and 6b depict side, top and bottom plan views, respectively, of the trapezoidal prism of the embodiment of the prism system shown in FIG. 3.

FIG. 6 depicts additional detail of the trapezoidal prism 174 of the embodiment depicted in FIG. 4. The trapezoidal prism 174 has an optical surface S6 240, an optical surface S7 242, an optical surface S8 244, and an optical surface S9 246. The surface S6 240 and the surface S7 242 terminate and intersect at an edge 248. The surface S7 242 and the surface S8 244 intersect and terminate at an edge 250 at an angle referenced as 251. Advantageously, the angle 251 is substantially 135°. The surface S8 244 and the surface S9 246 intersect and terminate at an edge 252 at an angle 254 which is advantageously 50°21′ in the present embodiment. The surface S9 246 and the surface S6 240 intersect and terminate at an edge 256. The surface S6 240 has a length referenced as 258 in FIG. 6. Advantageously, the length 258 is 9.5 mm in the present embodiment. The surface S6 240 and the surface S8 244 are substantially parallel and spaced at a distance referenced as 260 in FIG. 6. In the present embodiment, the distance 260 is 8.0 mm measured in a direction perpendicular to the surface S6 240 and the surface S8 244. The edge 250 and the edge 248 are spaced at a distance referenced as 261 along a plane 262 defined parallel with the surface S8 244. Advantageously, the distance 261 is 8.0 mm in the present embodiment.

Figure 6A:
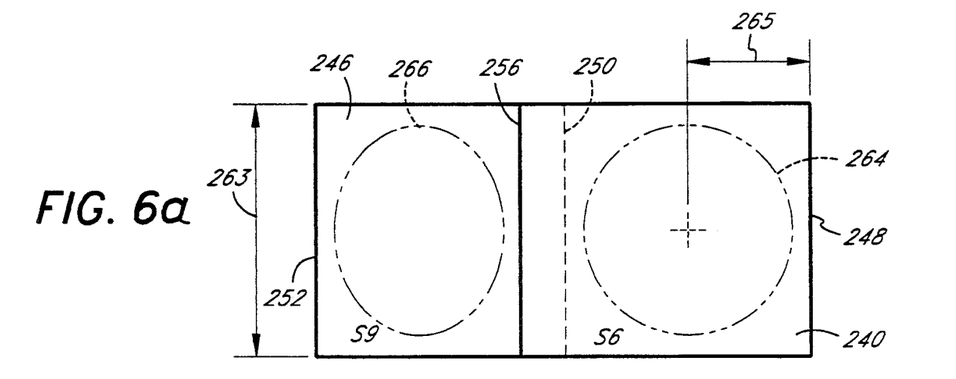

FIG. 6a is a top plan view of the trapezoidal prism 174 illustrating the surface S6 240 and the surface S9 246. As depicted in FIG. 6a the trapezoid prism 174 has a thickness referenced as 263. Preferably, the thickness 263 is approximately 8 mm in the present embodiment. As shown in FIG. 5a, the surface S6 240 has a clear aperture 264 defined in the present embodiment as a 6.5 mm minimum radius circular aperture centered across the width of the surface and centered at a distance 265 from the edge 248. Preferably, the distance 265 is 4.0 mm in the present embodiment. The surface S9 246 has a clear aperture 266 centered on the surface. In the present embodiment, the clear aperture 266 is defined as a 6.5 mm by 8.5 mm minimum oval.

Figure 6B:
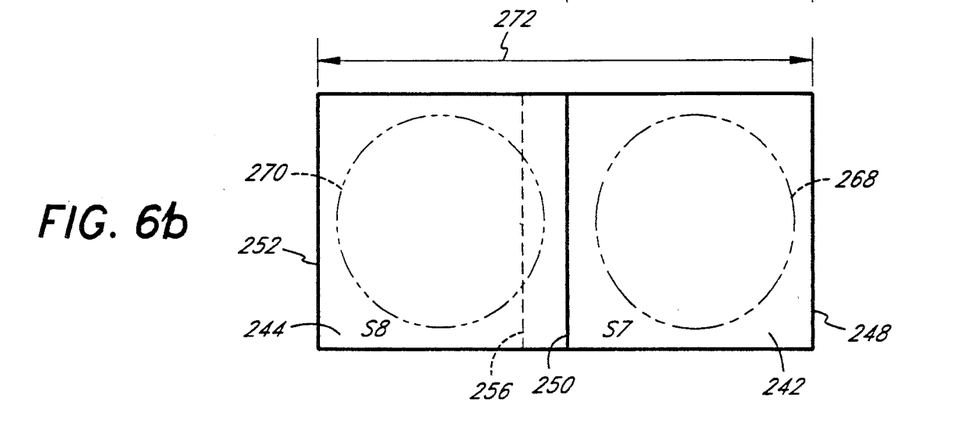

FIG. 6b depicts a bottom plan view of the trapezoidal prism 174 illustrating the surface S7 242 and the surface S8 244 with clear apertures 268 and 270, respectively. As depicted in FIG. 6b, the trapezoid prism 174 has a length referenced as 272 from the edge 252 to the edge 248 measured along the reference plane 262. Preferably, the length 272 is 16.13 mm in the present embodiment. In one embodiment, the clear aperture 268 for the surface S7 242 is defined as a 6.5 mm by 9.2 mm oval centered on the surface S7 242 with its minor axis parallel to and centered between the edge 248 and the edge 250. Advantageously, the clear aperture 270 is a 6.5 mm by 6.7 mm oval centered on the surface S8 244 with its major axis centered parallel between the edge 248 and the edge 252. In the present embodiment, the surface quality of the clear apertures 264, 266, 268 and 270 is advantageously 40/20, well known in the art.

Many of the surfaces in the prisms have coatings to facilitate the function of the prism. In the present embodiment, the surface S6 240 has an anti-reflection coating with transmission $\geq 99.8\%$ at $90° \pm 0.5°$ angle of incidence. The surface S8 244 has a coating with transmission $\geq 98.5\%$ at $10.7° \pm 0.5$ angle of incidence for internally incident light. The surface S9 246 has a low extinction thin film coating with reflection of the 's' polarization state ($R_s$) (i.e., normal to the plane of incidence) $>90\%$, and with reflection of the 'p' polarization state ($R_p$)=$12.5\% \pm 2.5\%$ at $39°39' \pm 0.5°$ angle of incidence. The material for the trapezoidal prism 174 of the embodiment depicted in FIG. 4 is BK7 grade A fine annealed optical glass, as is well known in the art.

Figure 7:
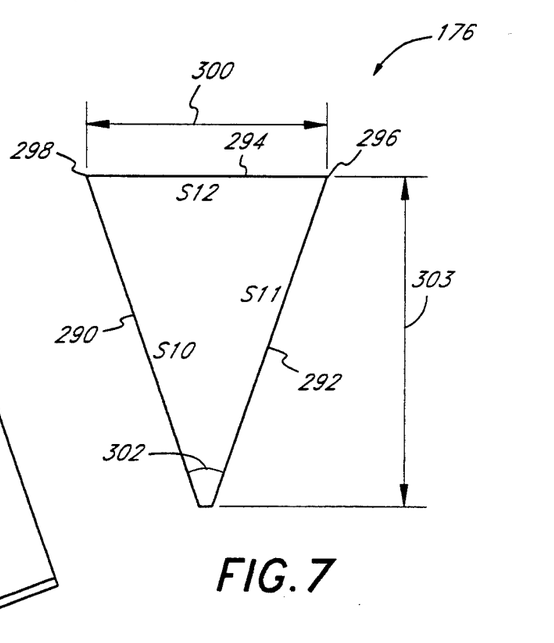
FIGS. 7 and 7a depict a side view and a plan view of one optical surface, respectively, of an embodiment of the chromatic correcting prism of the prism system embodiment shown in FIG. 4.

The chromatic correcting prism 176 of the embodiment of the prism system 170 depicted in FIG. 4 is shown in more detail in FIG. 7. As depicted, the chromatic correcting prism 176 has an optical surface S10 290, an optical surface S11 292, and a surface S12 294 configured to form a triangular prism. The surface S11 292 and the surface S12 294 intersect and terminate at an edge 296. The surface S10 290 and the surface S12 294 intersect and terminate at an edge 298. Preferably, the surfaces S10 290 and S11 292 are symmetrical. The surface S12 294 has a length referenced as 300, which is 7.78 mm in the present embodiment. Thus, the edge 296 and the edge 298 are separated by the distance 300. The surface S10 290 and the surface S11 292 approach each other at an angle referenced as 302. In the present embodiment, the angle 302 is advantageously $38°20'$. The surface S11 292 and the surface S10 290 are terminated a distance referenced as 303 from the surface S12 294, measured perpendicular to the surface S12 294. The distance 303 is 10.5 mm in the present embodiment.

Figure 7A:
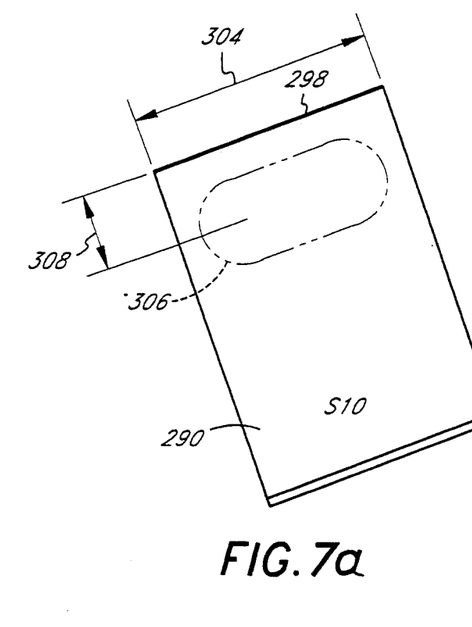

FIG. 7a depicts a view of the surface S10 290. In this embodiment, the prism 176 has a thickness referenced as 304 in FIG. 7a. In the present embodiment, the thickness 304 is advantageously 8.0 mm. Desirably, the surface S10 290 has an oval clear aperture 306. In the present embodiment, the clear aperture is an oval centered with the major axis parallel to, and a distance referenced as 308 from, the intersection at 298. The minor axis is centered on the surface S10 290 as depicted. Preferably, the clear aperture 306 is defined as a 6.5 mm by 2.8 mm oval in the present embodiment, and the surface quality across the clear aperture 306 is advantageously 40/20, as known in the art. In the present embodiment, the surface S11 292 also has a similar clear aperture defined on its surface.

As with the trapezoidal prism 174, the chromatic correcting prism 176 has coatings on some of its surfaces to facilitate performance. In one embodiment, each surfaces S10 290 and S11 292 have an anti-reflective coating (e.g. reflectance $\leq 3\%$ at $35.5° \pm 1.0°$ angle of incidence, as is well known in the art). In the present embodiment, SFII grade A fine annealed glass is the material for the correcting prism 176.

When the prisms as described above are assembled as the unitary prism system 170 of the embodiment shown in FIG. 4, the light beams reflect as depicted and explained below for a wavelength of $785 \pm 22$ nm. For discussion purposes, a reference plane 237 is defined along one side of the prism system 170 as illustrated in FIG. 4a. The incident beam 178 from the light source 102 enters the surface S10 290 at an incidence angle 326 and parallel with the reference plane 237. The light beam exits the prism 176 into the air-gap as the light beam 180 and enters the prism 172 through surface S2 202. A portion of the light beam reflects at the thin film on the surface S9 246 and exits the surface S3 204 as the light beam 188. In one embodiment, the beam 188 may be directed to the detection system 189. Because this reflected beam is a portion of the input beam, the detection system 189 receiving the light beam 188 may monitor the intensity of the incident light. The remainder of the light beam which does not reflect at the thin film on the surface S9 246, passes into the trapezoidal prism 174, reflects internally at the surface S7 242 and exits as the light beam 182 through the surface S6 240.

In the embodiment described, if the angle of incidence 326 of the light beam 178 is $35°26'$, the light beam exits the prism 174 with a total deviation from the entrance beam 178 to the exit beam 182 of $87°37' \pm 5'$, parallel to the reference plane 237 within 5', and the light beam 182 exits normal to the surface S6 240 within 5'.

The lens 190 focusses the light beam 182 onto the optical media 191. The light beam reflects back through the lens and enters normal to the surface S6 240, reflects internally at the surface S7 242, and then reflects at the thin film between the trapezoidal prism 174 and the plate prism 172. The resulting beam exits the trapezoidal prism 174 through the surface S8 244 as the light beam 184 at a deviation angle 328. The light beam 184 enters a detection system 185.

Part of the light beam returned from the optical media 190 also passes through the thin film, reflects at the surface S2 202 and exits the plate prism 172 as the light beam 186. This reflection is available because of the air gap in the prism system. In one embodiment, the light beam 184 and the light beam 186 can both be directed to separate detection systems 185 and 187, respectively. For instance, the detection system 185 may collect data signals, and the detection system 187 may collect control signals (e.g., focus and tracking servo information).

As explained above, the embodiment described is substantially achromatic within a typical range of wavelength changes from a conventional laser light source. Accordingly, shifts in the wavelength of the incident light do not significantly affect the resulting lateral position of the focussed beam on the optical media 190.

Calculations simulating the performance of the prism system 170 for variations in wavelength from 780 nm to 785 nm are shown in the chart below. Phi is the incidence angle on the correcting prism (i.e., 35°26' in the present embodiment) and its variation is estimated as ±0.5°. The wavelength shift is indicated in one column and the corresponding shift in the focussed spot from the prism system is indicated in the columns for incidence angles of Phi ±- 0.5°. For instance, as seen in the first line of the table, for a wavelength shift of the incident light beam of 780 nm–781.5 nm, the focussed spot shifts by −0.2 nm at the incident angle of Phi, by 2.6 nm for an incidence angle of Phi −0.5°, and by −2.9 nm for a incidence angle of Phi +0.5°.

| Wavelength Shift | Phi − 0.5° | Phi | Phi + 0.5° |
| --- | --- | --- | --- |
| 780–781.5 nm | 2.6 nm | −0.2 nm | −2.9 nm |
| 780–783 nm | 5.2 nm | −0.2 nm | −5.6 nm |
| 780–785 nm | 9.0 nm | −0.1 nm | −9.0 nm |

As can be seen from the above table, the lateral displacement at the incidence angle, Phi, varies by less than 1 nm for a wavelength shift from 780 to 783 nm, with an incidence angle of Phi. This is contrasted with a lateral displacement of approximately 200 nm for a wavelength shift of 3 nm in an embodiment similar to that described above but without the chromatic correction. This indicates a substantially achromatic system.

Figure 8:
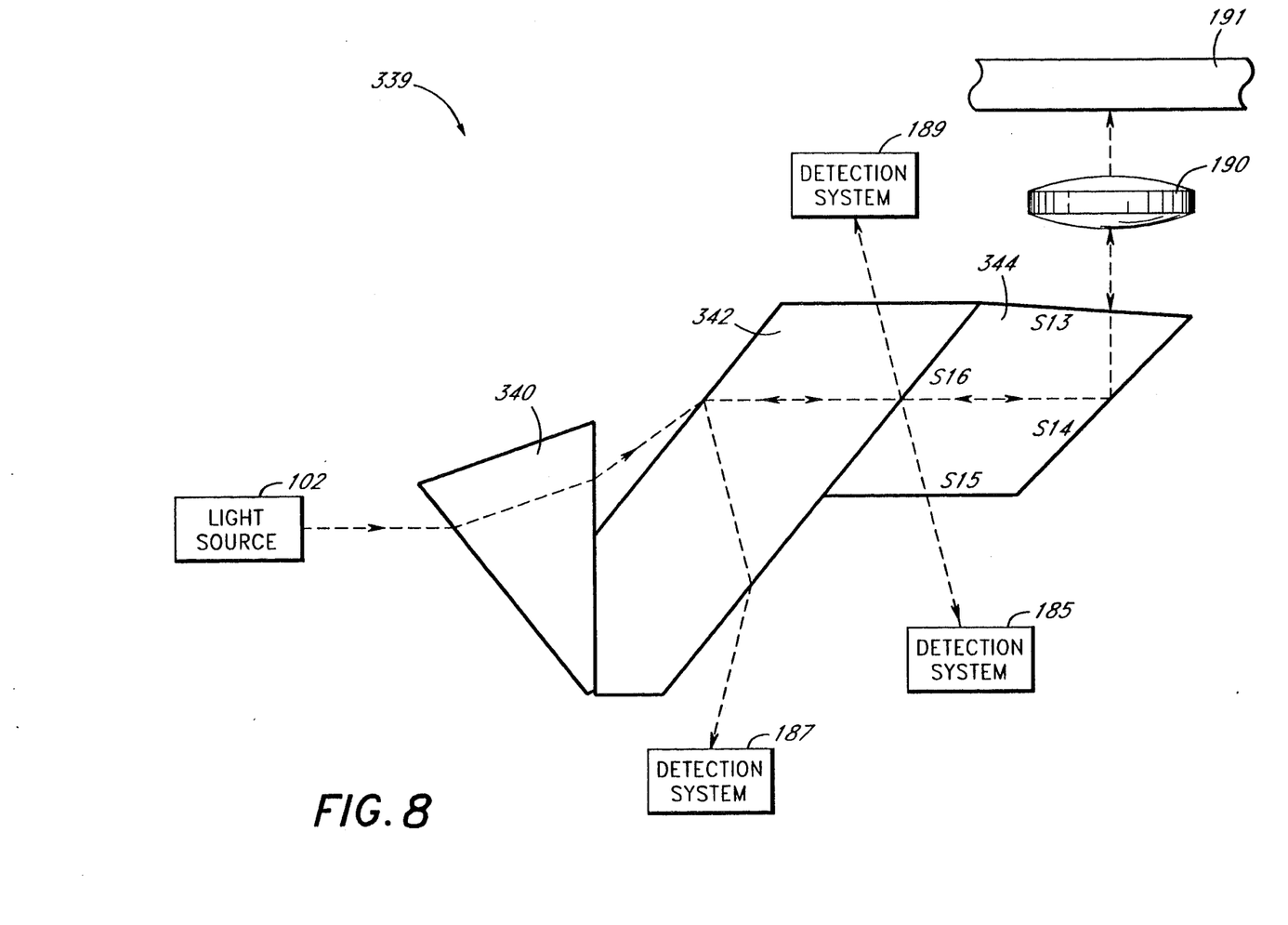
FIG. 8 depicts an alternative embodiment of an air-spaced, multi-element prism system of the present invention.

FIG. 8 depicts a prism system 339 as an alternative embodiment of the present invention. This embodiment has the correcting prism 340, a plate prism 342, and a quadrilateral prism 344. The correcting prism 340 and the plate prism 342 are both substantially the same as the correcting prism 176 and the plate prism 172, respectively, of the prism system 170 depicted in FIG. 4. The quadrilateral prism 344 differs from the trapezoidal prism 174.

Figure 9:
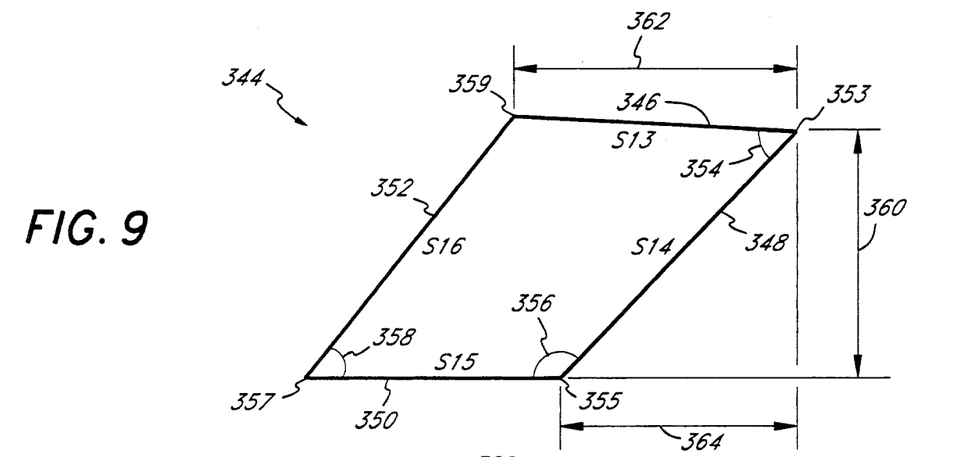
FIG. 9, 9a, and 9b depict side, top and bottom plan views, respectively, of the quadrilateral prism of the alternative embodiment illustrated in FIG. 8.
Figure 9A:
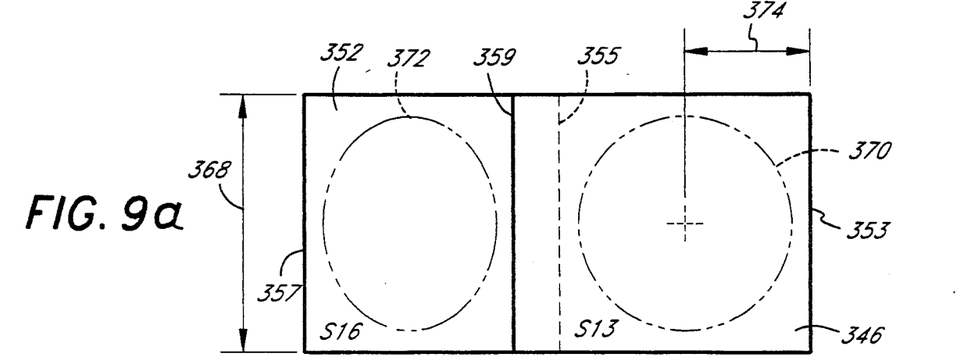
Figure 9B:
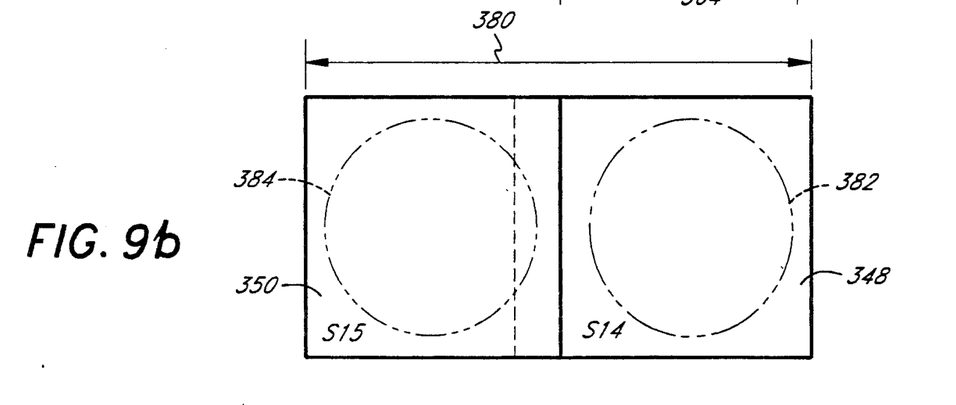

The quadrilateral prism 344 depicted in FIG. 8 is depicted in more detail in FIGS. 9, 9a and 9b. The quadrilateral prism 344 has a surface S13 346, a surface S14 348, a surface S15 350, and a surface S16 352. The surface S13 346, the surface S14 348, the surface S15 350, and the surface S16 352 are configured similarly but not identical to the surface S6 240, the surface S7 242, the surface S8 244, the surface S9 246 of the trapezoidal prism 174. The surface S13 346 and the surface S14 348 intersect at an edge 353 at an angle referenced as 354; the surface S14 348 and the surface S15 350 intersect at an edge 355 at an angle referenced as 356; and the surface S15 350 and the surface S16 352 intersect at an edge 357 at an angle referenced as 358, in FIG. 9. Finally, the surface S16 352 and the surface S13 346 intersect at an edge 359. In one embodiment, the angle 354 is 49°40', the angle 356 is 135° and the angle 358 is 50°21'. The distance between the edge 353 and the edge 355, measured perpendicular to the surface S15 350 is referenced as 360 in FIG. 9. In one embodiment, the distance 360 is 8.0 mm. Additionally, the distance from the edge 353 to the edge 359 is referenced as 362 in FIG. 9. In one embodiment, the distance 362 is 8.9 mm measured parallel to the surface S15 350. Finally, the distance between the edge 353 and the edge 355, measured along a plane parallel with the surface S15 350, is referenced as 364 in FIG. 9. In one embodiment, the distance 364 is preferably 8.0 mm.

FIG. 9a is a plan view of the surface S13 346 and also depicts the surface S16 352. FIG. 9a depicts the thickness of the prism 344 referenced as 368. In one embodiment, the thickness 368 is 8.0 mm. Advantageously, the prism 344 has a clear aperture 370 defined along the surface S13 346, and a clear aperture 372 defined along the surface S16 352, as depicted in FIG. 9a. In the present embodiment, the clear aperture 370 is a circular aperture centered across the surface and a distance 374 from the edge 353. In one embodiment, the clear aperture 370 is a circular aperture with a minimum diameter of 6.5 mm and the distance 374 is 4.0 mm. Advantageously, the surface S16 352 also has a clear aperture 372 centered on the surface. In one embodiment, the clear aperture 372 is a 6.5 mm by 8.5 mm oval aperture centered on the surface S16 352 as depicted in FIG. 9a.

FIG. 9b is a plan view of the surface S14 348 and also illustrates the surface S15 350. The overall length of the prism 344 from the edge 353 to the edge 357 measured along a plane parallel to the surface S15 350 is referenced as 380 in FIG. 9b. In one embodiment, the length 380 is 16.13 mm. As seen in FIG. 9b, the surface S14 348 has a clear aperture 382 centered on the surface, and the surface S15 350 also has a clear aperture 384 centered on the surface. In one embodiment, the clear aperture 382 is a 6.5 mm by 9.2 mm oval, and the clear aperture 384 is a 6.5 mm by 6.7 mm oval.

Advantageously, the quadrilateral prism 344 also has coatings on some of its optical surfaces. In one embodiment, the surface S13 346 has a coating with reflectance ≦0.2% at 4°40'±5' angle of incidence with respect to the normal for internally incident light. In the same embodiment, the surface S15 350 has a coating with reflectance ≦0.5% at 10.7°±0.5° angle of incidence with respect to the normal, for internally incident light. Finally, the surface S16 352 advantageously has a thin film coating with $R_s > 90\%$, $R_p = 12.5\%$ ±2.5% at 39°39'±.5° angle of incidence with respect to the normal. Preferably, this thin film coating also has less than 8° phase shift for all operating and optical conditions.

With the configuration shown in FIG. 9, the deviation angle of the entrance beam to the exit beam totals, advantageously, 90°. This facilitates manufacturing because mounting components for 90° deviations are easier to fabricate than for 87° deviations, as in the embodiment of FIG. 4. For the dimensions and coatings specified for the embodiment of FIG. 8, the prism is not perfectly achromatic. However, the prism system illustrated in FIG. 8 is substantially achromatic over an acceptable range of operating wavelengths around the design wavelength.

Calculations simulating the performance of the prism system 339 of FIG. 8 for variations in the wavelength from 780 nm to 785 nm are shown in the chart below. Again, Phi is 35°26' in this embodiment.

| Wavelength shift | Phi − 0.5° | Phi | Phi + 0.5° |
| --- | --- | --- | --- |
| 780–781.5 nm | 12.5 nm | 9.8 nm | 7.1 nm |
| 780–783 nm | 25.1 nm | 19.6 nm | 14.3 nm |

-continued

| Wavelength shift | Phi − 0.5° | Phi | Phi + 0.5° |
| --- | --- | --- | --- |
| 780–785 nm | 42.0 nm | 32.9 nm | 24.0 nm |

As can be seen, the design shown in FIG. 8 is not as achromatic as the design shown in FIG. 4, however for a wavelength shift of 780 to 783 nm, the lateral displacement of the focussed spot from the light exiting the prism is only 19.6 nm. Again, this should be contrasted with a lateral displacement of approximately 200 nm for a wavelength shift of 3 nm in an embodiment similar to the embodiment described above but without the chromatic correction.

Although the preferred embodiment of the present invention has been described and illustrated above, those skilled in the art will appreciate that various changes and modifications can be made to the present invention without departing from its spirit. Accordingly, the scope of the present invention is limited only by the scope of the following appended claims.

What is claimed is:

1. An optical system for use with reflective-type optical media devices, said system comprising:

a light source which provides an incident light beam within a range of operating wavelengths from a given wavelength, the wavelength of said light beam typically varying over said range during operation of said system;

a chromatic correcting prism having an entrance surface and an exit surface, said incident light beam passing from said light source through a portion of said entrance surface and from said portion of said entrance surface through a portion of said exit surface during operation of said system;

an anamorphic prism through which the light beam passes and is corrected for light beam ellipticity, said correcting prism being attached directly to the anamorphic prism to form a multi-element unitary prism, said anamorphic prism defining at least one entrance surface and at least one exit surface, said light beam passing from said portion of said exit surface of said correcting prism through a portion of said at least one entrance surface of said anamorphic prism and from said portion of said at least one entrance surface of said anamorphic prism through a portion of said at least one exit surface of said anamorphic prism and through a focussing lens to form a spot on a reflective-type optical media device, wherein the chromatic correcting prism is attached to said anamorphic prism such that an air gap exists between said portion of the correcting prism exit surface and said portion of the anamorphic prism entrance surface, wherein the light beam passes through the air gap, and wherein the unitary multi-element prism is substantially achromatic for a predetermined angle of incidence of the incident light beam to the entrance surface of the correcting prism, within said range of operating wavelengths.

2. The optical system of claim 1., wherein the chromatic correcting prism is symmetrical and provides no net expansion to the incident light beam.

3. The optical system of claim 1, wherein the anamorphic prism comprises:

a first prism and a second prism directly attached at an interface as a single unitary anamorphic prism; and a thin-film, low-extinction coating across at least a portion of the interface of the first and second anamorphic prisms, wherein the thin film coating provides a first reflecting surface for directing at least a portion of a return beam from said reflective-type optical media device towards a first detection system.

4. The optical system of claim 3, wherein said portion of said anamorphic prism entrance surface provides a second reflecting surface for directing at least a portion of the return beam from the reflective-type optical media device to a second detection system.

5. The optical system of claim 4, wherein the thin film coating also provides a third reflecting surface for directing at least a portion of the incident light beam towards a third detection system.

6. The optical system of claim 1, wherein the system is substantially achromatic over a range of angles from the predetermined angle of incidence.

7. The optical system of claim 6, wherein the range is at least ±/ 0.5° from the predetermined angle of incidence.

8. The optical system of claim 1, wherein the multi-element unitary prism is substantially achromatic over a range of wavelength shifts within the range of operating wavelengths.

9. The optical system of claim 8, wherein the multi-element unitary prism has at least a 75% reduction in the chromatic aberration from a similar prism without chromatic correction.

10. The optical system of claim 8, wherein the multi-element unitary prism is achromatic to the extent that the lateral displacement of the focussed spot on the reflective-type optical media device is less than 50 nm for an incident light beam wavelength shift of ±- 0–5 nm within the range of operating wavelengths.

11. A prism system for use with reflective-type optical media devices in an optical system having a light source which produces an incident light beam within a range of operating wavelengths from a given wavelength, the wavelength of said light beam typically varying over said range during operation of said system, said prism system comprising:

a chromatic correcting prism having an entrance surface and an exit surface, said incident light beam passing from said light source through a portion of said entrance surface and from said portion of said entrance surface through a portion of said exit surface during operation of said system;

an anamorphic prism through which the light beam passes and is shaped by said anamorphic prism, said correcting prism being attached directly to the anamorphic prism to form a multi-element unitary prism, said anamorphic prism defining at least one entrance surface and at least one exit surface, said light beam passing from said portion of said exit surface of said correcting prism through a portion of said at least one entrance surface of said anamorphic prism and from said portion of said at least one entrance surface of said anamorphic prism through a portion of said at least one exit surface of said anamorphic prism and through a focussing lens to form a spot on a reflective-type optical media device, wherein the chromatic correcting prism is attached to said anamorphic prism such that an air gap exists between said portion of the correcting prism exit surface and said portion of the anamorphic prism entrance surface, wherein the light beam passes through the air gap, and wherein the multi-element unitary prism is substantially achromatic for a predetermined angle of incidence of the incident light beam to the entrance surface of the correcting prism, within said range of operating wavelengths.

12. The prism system of claim 11, wherein the multi-element unitary prism is substantially achromatic over a range of angles from the predetermined angle of incidence.

13. The prism system of claim 12, wherein the range is at least ±0.5° from the predetermined angle of incidence.

14. The prism system of claim 11, wherein the multi-element unitary prism is substantially achromatic over a range of wavelength shifts within the range of operating wavelengths.

15. The prism system of claim 14, wherein the multi-element unitary prism has at least a 75% reduction in the chromatic aberration from a similar prism system without chromatic correction.

16. The prism system of claim 14, wherein the multi-element unitary prism is achromatic to the extent that the lateral displacement of the focussed spot on the reflective-type optical media device is less than 50 nm for an incident light beam wavelength shift of ±0–5 nm within the range of operating wavelengths.

17. A prism system for use with reflective-type optical devices in an optical system having a light source which produces an incident light beam within a range of operating wavelengths from a given wavelength, the wavelength of said light beam typically varying over said range during operation of said system, said prism system comprising.
  a chromatic correcting prism having an entrance surface and an exit surface, said incident light beam passing from said light source through a portion of said entrance surface and from said portion of said entrance surface through a portion of said exit surface during operation of said system; and
  an anamorphic prism through which the light beam passes and is shaped by said anamorphic prism, said correcting prism being attached directly to the anamorphic prism to form a multi-element unitary prism, said anamorphic prism defining at least one entrance surface and at least one exit surface, said light beam passing from said portion of said exit surface of said correcting prism through a portion of said at least one entrance surface of said anamorphic prism and from said portion of said at least one entrance surface of said anamorphic prism through a portion of said at least one exit surface of said anamorphic prism and through a focussing lens to form a spot on a reflective-type optical media device, wherein the chromatic correcting prism is attached to said anamorphic prism such that an air gap exists between said portion of the correcting prism exit surface and said portion of the anamorphic prism entrance surface, wherein the light beam passes through the air gap, wherein said portion of the anamorphic prism entrance surface reflects at least a portion of an internally incident return beam from the reflective-type optical media device to a first detection system, and wherein the multi-element unitary prism is substantially achromatic for a predetermined angle of incidence of the incident light beam to the entrance surface of the correcting prism, within said range of operating wavelengths.

18. The prism system of claim 17, wherein the chromatic correcting prism is symmetrical and provides no net expansion to the incidence light beam.

19. The prism system of claim 17, wherein the anamorphic prism comprises:
  a first prism and a second prism directly attached at an optical interface to form a single unitary anamorphic prism; and
  a thin-film, low-extinction coating across at least a portion of the interface of the first and second anamorphic prisms, wherein the thin film coating provides a reflecting surface for directing at least a portion of the incident light beam towards a second detection system and a portion of return beam from the reflective type optical memory device to a third detection system.

20. The prism system of claim 19, wherein the system is substantially achromatic over a range of angles from the predetermined angle of incidence.

21. The prism system of claim 20, wherein the range is at least ±0.5° from the predetermined angle of incidence.

22. The prism system of claim 19, wherein the prism system is substantially achromatic over a range of wavelength shifts within the range of operating wavelengths.

23. The prism system of claim 22, wherein the prism system has at least a 75% reduction in the chromatic aberration from a similar prism system without chromatic correction.

24. The prism system of claim 22, wherein the prism system is achromatic to the extent that the lateral displacement of the focussed spot on the reflective-type optical media device is less than 50 nm for an incident light beam wavelength shift of ±0–5 nm within the range of operating wavelengths.

* * * * *